(12) United States Patent
Kaipainen

(10) Patent No.: US 7,143,771 B2
(45) Date of Patent: Dec. 5, 2006

(54) SALT TRUCK WASH SYSTEM

(75) Inventor: Pasi Kaipainen, Ann Arbor, MI (US)

(73) Assignee: Interclean Equipment, Inc., Ann Arbor, MI (US)

( * ) Notice: Subject to any disclaimer, the term of this patent is extended or adjusted under 35 U.S.C. 154(b) by 502 days.

(21) Appl. No.: 10/242,049

(22) Filed: Sep. 12, 2002

(65) Prior Publication Data

US 2003/0047201 A1    Mar. 13, 2003

(51) Int. Cl.
*B08B 3/02* (2006.01)
(52) U.S. Cl. .................... 134/57 R; 134/113; 134/123; 134/198
(58) Field of Classification Search ............... 134/45, 134/56 R, 57 R, 58 R, 113, 123, 148, 151, 134/198
See application file for complete search history.

(56) References Cited

U.S. PATENT DOCUMENTS

| | | | | |
|---|---|---|---|---|
| 5,498,329 A | * | 3/1996 | Lamminen et al. | 210/86 |
| 5,853,494 A | * | 12/1998 | Andersson | 134/10 |
| 6,000,631 A | * | 12/1999 | Lamminen et al. | 239/200 |
| 6,237,614 B1 | * | 5/2001 | Retter | 134/99.1 |
| 6,372,053 B1 | * | 4/2002 | Belanger et al. | 134/34 |
| 6,508,260 B1 | * | 1/2003 | Anderson | 134/113 |

* cited by examiner

*Primary Examiner*—Joseph L. Perrin
(74) *Attorney, Agent, or Firm*—Brinks Hofer Gilson & Lione

(57) ABSTRACT

A vehicle wash system having a series of spray assemblies for use in cleaning vehicles such as a highway salt truck. As the vehicle is driven through the vehicle wash system, sensors alert the control system as to the location of the vehicle. While using a single pump, the control system then activates and deactivates valves to selectively open and close high pressure flow paths to various spray assemblies as the vehicle moves through the vehicle wash system. The nozzles in the spray assemblies receive full pressure water when the corresponding valve is opened and are oriented to clean specific portions of the vehicle in a predetermined sequence.

17 Claims, 7 Drawing Sheets

SALT TRUCK WASH SYSTEM

BACKGROUND OF THE INVENTION

1. Field of Invention

The present invention relates to vehicle wash systems. More specifically, the present invention relates to a vehicle wash system for salt trucks, such as salt trucks used by governmental transportation departments for dispensing salt onto roadways.

1. Description of the Prior Art

Salt trucks, as used by various state and local departments of transportation, are particularly susceptible to corrosion as a result of the vehicles carrying and dispersing salt. For this reason, the average service life of a highway salt truck is two to three years. If properly washed after each use, the service life of these quarter million dollar vehicles can be extended to approximately seven to eight years.

Because of the nature and shape of salt trucks, proper cleaning has in the past been costly in terms of time, man power, and water use. Various areas of the truck require specific cleaning to remove the salt. These areas include, but are not limited to, the front or leading side of the bed, the back of the cab, the inside of the bed, the underside of the bed, the chassis beneath the bed, the back of the bed and the salt spreader.

There are many types of vehicle wash systems currently known in the art. The tunnel-type car wash system which uses brushes or strips of material to rub against the vehicle would be impractical because of the unique shape of the salt truck. A typical brushless system has jets arrayed on a frame that spray the vehicle passing through it. These systems use a great deal of water and do not reach all necessary portions of the salt truck to clean the truck and prevent corrosion. One type of brushless system uses a number of nozzles directed towards the vehicle. However, all the nozzles are activated at the same time, which requires multiple high pressure pumps, adding significant cost to the system, to give adequate pressure to all the nozzles to properly clean the vehicle. Another type of brushless system uses a gantry-type washing apparatus adapted to move linearly along the length of a vehicle. The entire line of nozzles moves together and cannot be moved independently. This system, however, must be placed in position around the vehicle and the vehicle stopped while cleaning, thus increasing the time necessary to clean the vehicle. Additionally, the nozzle arrangement does not allow for the cleaning of all the necessary portions of a salt truck. The moving nozzles are a mechanical complication that will require additional parts and service above that of a fixed nozzle system. Since automated systems inadequately clean salt trucks, the only known method that is adequate involves manual cleaning. Manual cleaning, however, is time consuming and highly labor intensive.

Therefore, it is an object of the present invention to create a truck wash system that uses a minimum amount of water while still delivering full pressure spray through the nozzles. It is a further object of the present invention to create a truck wash system where the location of the vehicle in the system determines which nozzles are activated so specific areas of the truck will be washed at a time until the entire vehicle is cleaned. It is a further object of the invention to create a truck wash system that may be used to thoroughly clean salt trucks and other vehicle types.

BRIEF SUMMARY OF THE INVENTION

In view of the above mentioned drawbacks and other limitations of the prior art, it is seen that a need exists for an automatic vehicle wash system capable of thoroughly cleaning a salt truck.

In meeting this need, an object of the present invention is to provide a vehicle wash system that is specifically adapted to wash salt trucks with the goal of extending the service life of the trucks. The above is achieved using a unique spray assembly arrangement and sequencing. The spray assemblies include this series of arches that each contain nozzles that are set to spray in a pre-arranged orientation. One high pressure pump is used to send the water through the spray assemblies. The spray assemblies are turned on and off in a predetermined sequence as the salt truck moves through the wash system. As mentioned above, the nozzles on the spray assemblies are fixed and specifically directed at vulnerable areas of the salt truck which are washed until clean. The specific sequence of the wash allows full pressure water to be directed through selected nozzles to achieve thorough cleaning in a short period of time, while using less water than if the truck was indiscriminately washed all over.

Water reclamation, such as that described in U.S. Pat. No. 5,908,550 issued to Kaipainen, may be used to further reduce the overall water usage. In addition to washing salt trucks, the vehicle wash system is also capable of washing other types of vehicles with the addition of a spray assembly having spinner-type nozzles, such as those described U.S. Pat. No. 5,020,556 issued to Lamminen.

Further objects, features and advantages of the present invention will become apparent from consideration of the following description and the claims when taken in connection with the accompanying drawings.

DETAILED DESCRIPTION OF THE INVENTION

Figure 1:
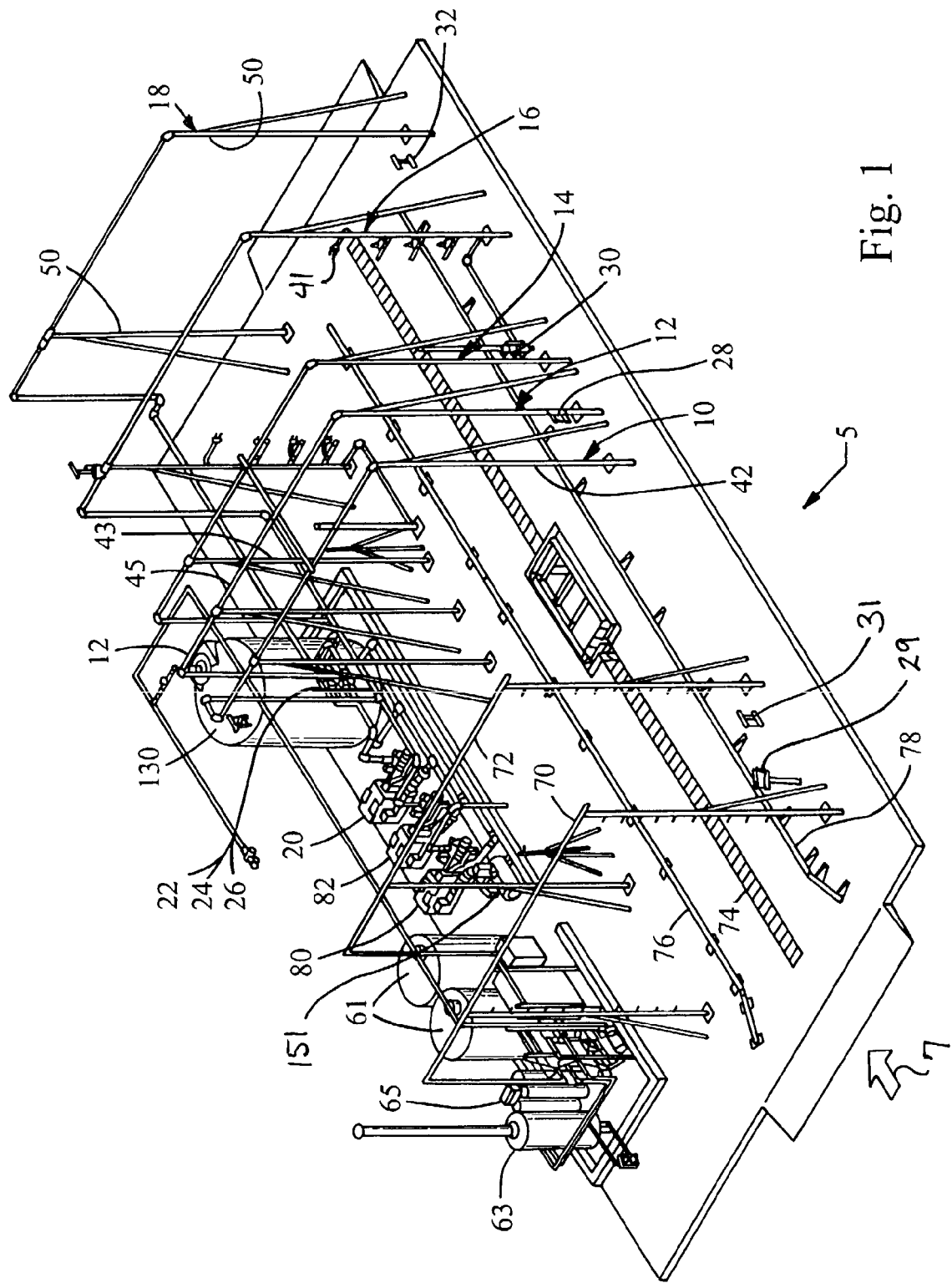
FIG. 1 is a perspective view of a vehicle wash system embodying the principles of the present invention.
Figure 6:
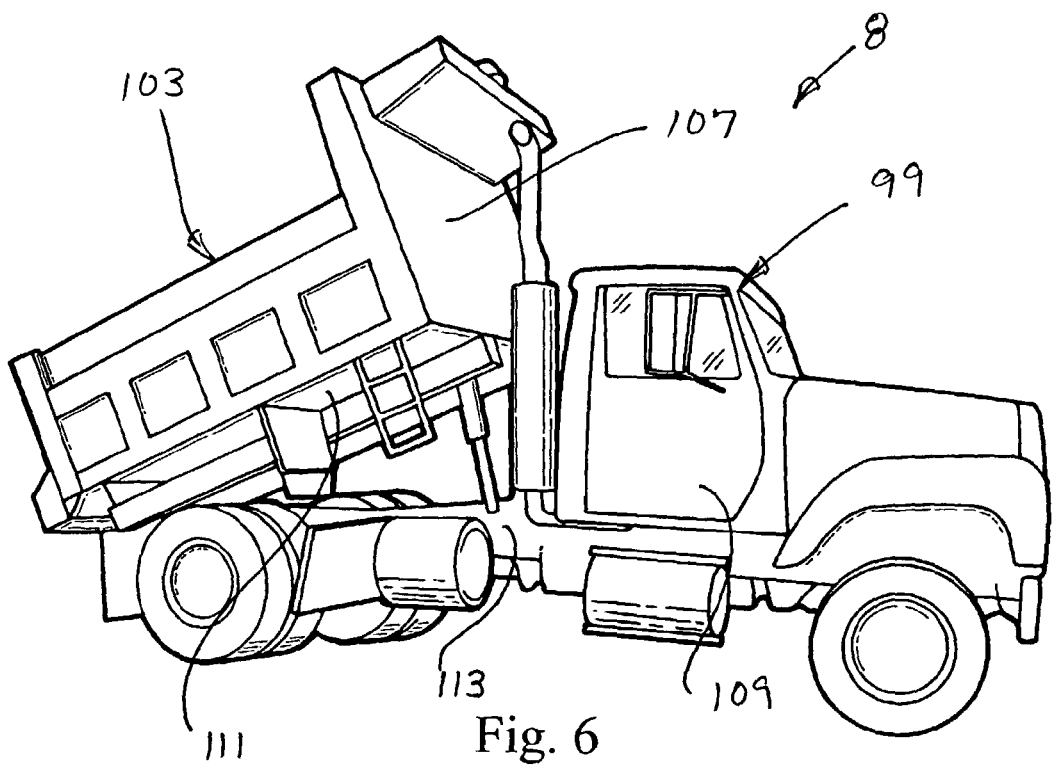
FIG. 6 is an illustration of a salt truck, typifying those with which the present invention would be utilized.
Figure 7:
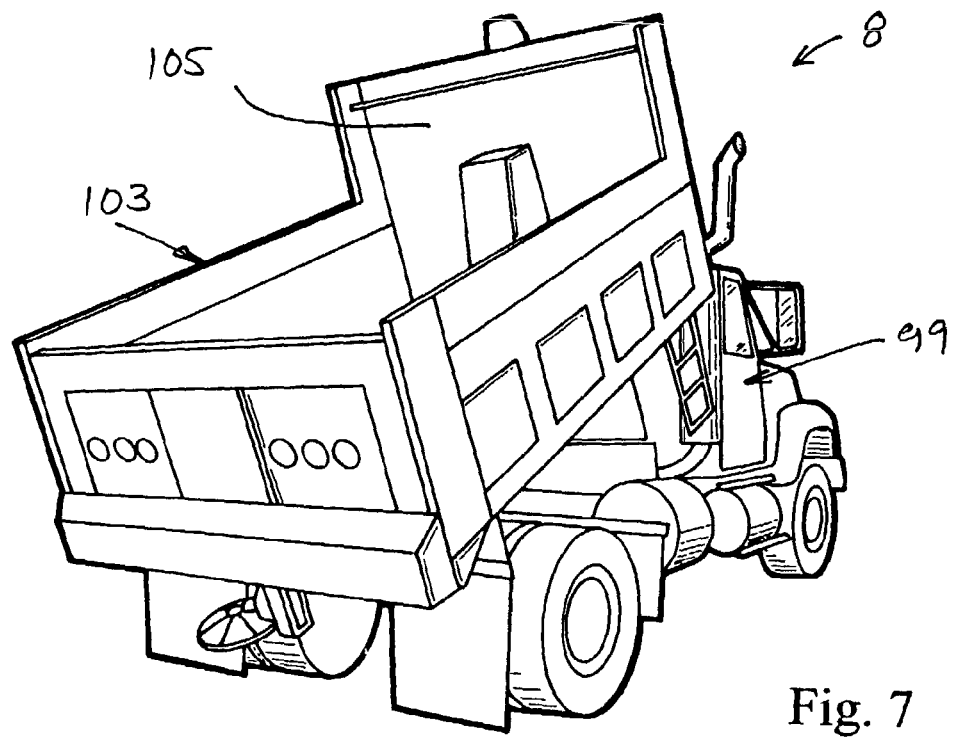
FIG. 7 is a rear quarter view of the salt truck seen in FIG. 6.
Figure 8:
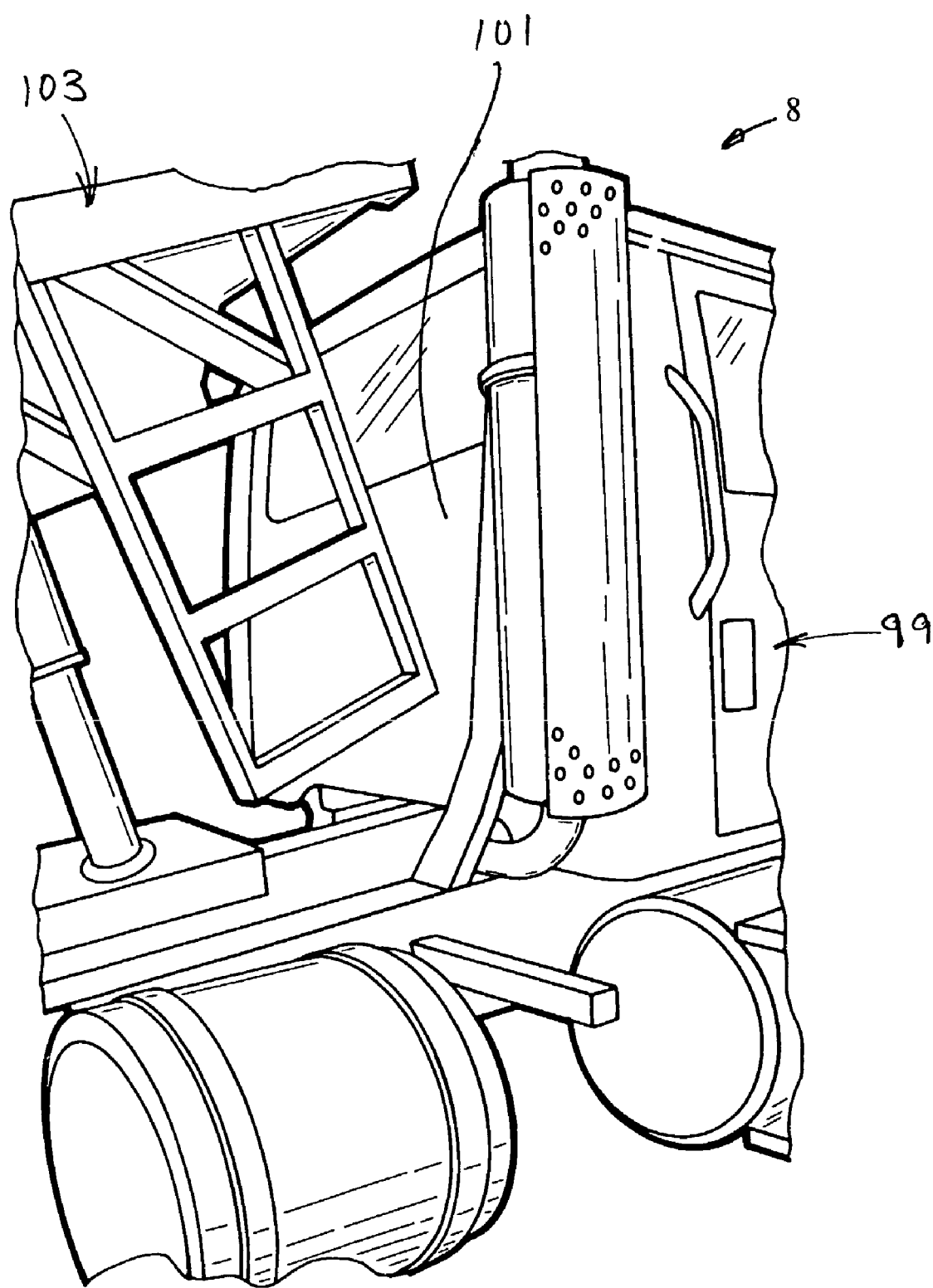
FIG. 8 is a close-up view detailing the rear cab area of the salt truck seen in FIGS. 6 and 7.

Referring now to the drawings, as seen in FIG. 1, the present invention is a vehicle wash system 5 specifically adapted to wash salt trucks 8, such as the truck 8 seen in FIGS. 6, 7 and 8. The wash system 5 includes, as its principle components, a series of arched spray assemblies 10, 12, 14 and 18, a high pressure pump 20, a set of valves 22, 24 and 26 (controlling the spray assemblies 10, 12, 14 and 18) and sensors 28, 30 and 32 (providing signals to a controller 36). In addition to the above, the overall system 5 may include other components commonly found in existing truck wash systems, such as chemical or soap arches 70 and 72, chemical tanks 61, a chassis wash 74, additional high pressure pumps 80 and 82, spinner assemblies 41, guide rails 76 and 78, a water heater 63 and a water softener 65. The latter components, their construction and operation, are not discussed in significant detail herein because persons skilled in this technology will readily appreciate the details thereof.

Referring to FIG. 1, use of the vehicle wash system 5 begins with a salt truck entering the system 5 in the direction of arrow 7 and with its bed preferably partially lifted (as seen in FIG. 6, 7 and 8). The guide rails 76 and 78 assist in centering the truck 8 as it progresses through the system 5. Upon the truck 8 triggering a photo-eye or other sensor 29, soap or other chemicals are dispensed via soap and chemical arches 70 and 72 and the truck 8 is coated with a detergent/chemical solution (alkaline or other) from the tanks 61. The truck 8 is then moved slowly forward via its own power or a conventional conveyor system (not shown) towards the spray assemblies 10, 12, 14 and 18. When the rear of the truck 8 clears the beam photo-eye 29, the chemical arches 70 and 72 stop dispensing their solutions.

As the rear of the truck 8 passes photo-eye 31 and as photo-eye 28 senses the front of the truck 8 starting to pass underneath the first of the spray assemblies 10, high pressure pump 82 is turned on and the chassis wash 74 is activated both by the controller 36, to clean the under side of the truck in a conventional manner.

With the turning on of the chassis wash 74, either simultaneously therewith or after a delay from the turning on thereof, the controller 36 signals high pressure pump 20 to operate and valve 22 to open. Water from the water tank 130 is drawn out by the high pressure pump 20. High pressure water is directed through the open valve 22 to spray assemblies 10 and 14, simultaneously. The nozzles 42 on the spray assembly 10 are fixed at a forward oblique angle (as indicated by arrow 45 in FIG. 2). The particular angle at which the nozzles 42 are directed is not critical to the present invention so long as water therefrom will reach at least the mid-line of the back of the cab of the truck 8 before being turned off or obstructed by another portion of the truck 8. Directed in this manner, water from the first spray assembly 10 cleans the back 101 of the cab 99 of the truck 8 with high pressure water as truck 8 passes by.

Figure 2:
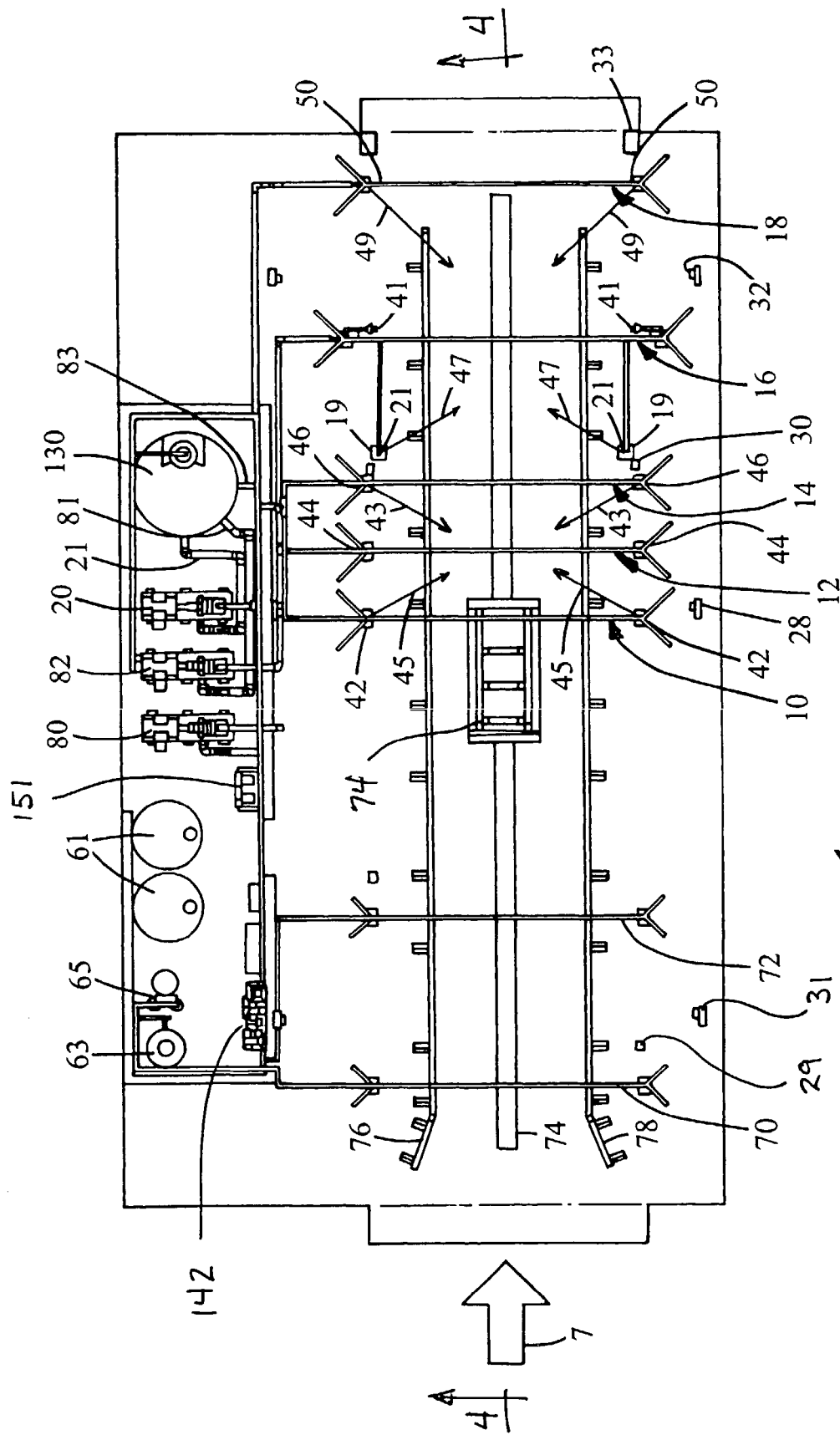
FIG. 2 is a top plan view of the vehicle wash system seen in FIG. 1.

Nozzles 46 mounted on spray assembly 14 are directed at a rearward oblique angle (as indicated by arrow 43 in FIG. 2). The particular angle at which these nozzles 43 are set is also not critical to the present invention. However, this angle should also be such that water from the nozzles 43 will be directed to reach to at least the mid-line of the truck 8, and specifically the mid-line of the forward face 107 of the front wall 105 of the bed 103 so as to clean that portion of the truck 8.

As the truck 8 continues to move forward through the vehicle wash system 5, another sensor 30, which may be also a photo-eye, is activated by the passing of the truck 8 and valve 22 is closed by controller 36, shutting off spray assemblies 10 and 14. At this time, valve 24 opened by the controller 36 and high pressure water from pump 20 is sent to spray assembly 12. Nozzles 44 on spray assembly 12 are fixed and directed generally downward. Additionally, these nozzles 44 may be directed slightly rearwardly. The timing of the turning on of this spray assembly 12 is such that high pressure water delivered through nozzles 44 is directed to clean the inside of the bed 103 of the truck 8. To reduce the overall length of the wash system 5, spray assembly 12 is located physically between spray assemblies 10 and 14 mentioned above.

In order to best achieve the cleaning desired by the above construction, it is noted that the nozzles 42 and 43 on spray assemblies 10 and 14, respectively, are generally located on the upright side portions of those assemblies 10 and 14. On spray assembly 12, the nozzles 45 are located on the top or crossbar portion of the spray assembly 12. Alternate locations for these nozzles 42, 43, and 45 are possible.

As the truck 8 continues it next encounters sensor 32 (also similar to sensor 28). When activated, controller 36 causes valve 24 to closed. The location of sensor 32 is such that the front of the truck 8, or other indicia, activates the sensor 32 when the end of the bed of the truck 8 has progressed beyond spray assembly 12.

With the closing of valve 24, valve 26 is opened by controller 36 and high pressure water from pump 20 is sent through nozzles 50, which are mounted on the forwardmost arched spray assembly 18. Nozzles 50 are fixed in position on the upright side portions of the spray assembly 18 and aimed generally rearward obliquely so the water flowing through them is directed along arrows 49. Directed in this manner, the nozzles 50 operate to clean or rinse the sides 109 of the cab 99 of the truck 8 and to clean the underside 111 of the raised bed 103 of the truck 8, as well as the top and sides of the chassis 113 of truck 8.

When the truck 8 exits the vehicle wash system 5, sensor 33 (similar to sensor 28) is activated and valve 26 is closed.

Alternatively, with the opening of valve 26, spray assembly 16, located between spray assemblies 14 and 18, may be pressurized by water from another high pressure pump 82 activated by the controller 36. Spray assembly 16 includes rotating spinner nozzles 41 on side portions of the assembly 16. These spinner nozzles may be used to clean the truck 8 generally in combination with the other spray assemblies 10, 12, 14 and 18, or may be individually used to clean other types of vehicles.

Coupled to spray assembly 16, and located rearward thereof, are upright spray arms 19. The spray arms 19 are equipped with fixed nozzles 21. When the truck 8 is moved though the vehicle wash system 5, high pressure water provided through the fixed nozzles 21 is directed in a forward oblique direction (see arrow 47 in FIG. 2) so as to clean the lower side details of the truck 8, as well as the rear of the truck 8, particularly, including the salt spreader mechanism of the truck 8. The vehicle wash is then complete.

Figure 3:
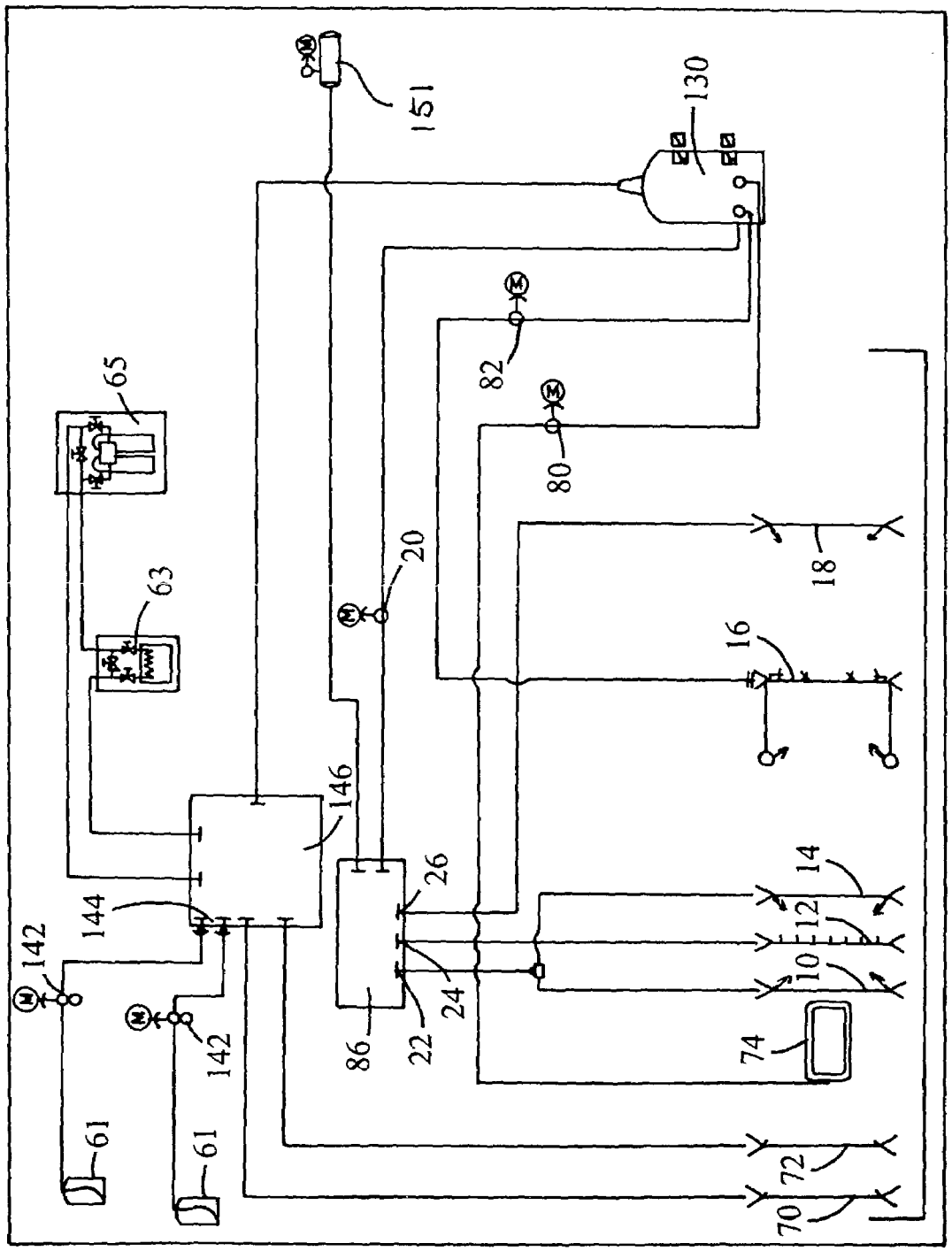
FIG. 3 is a schematic view of the vehicle wash system seen if FIG. 1.
Figure 4:
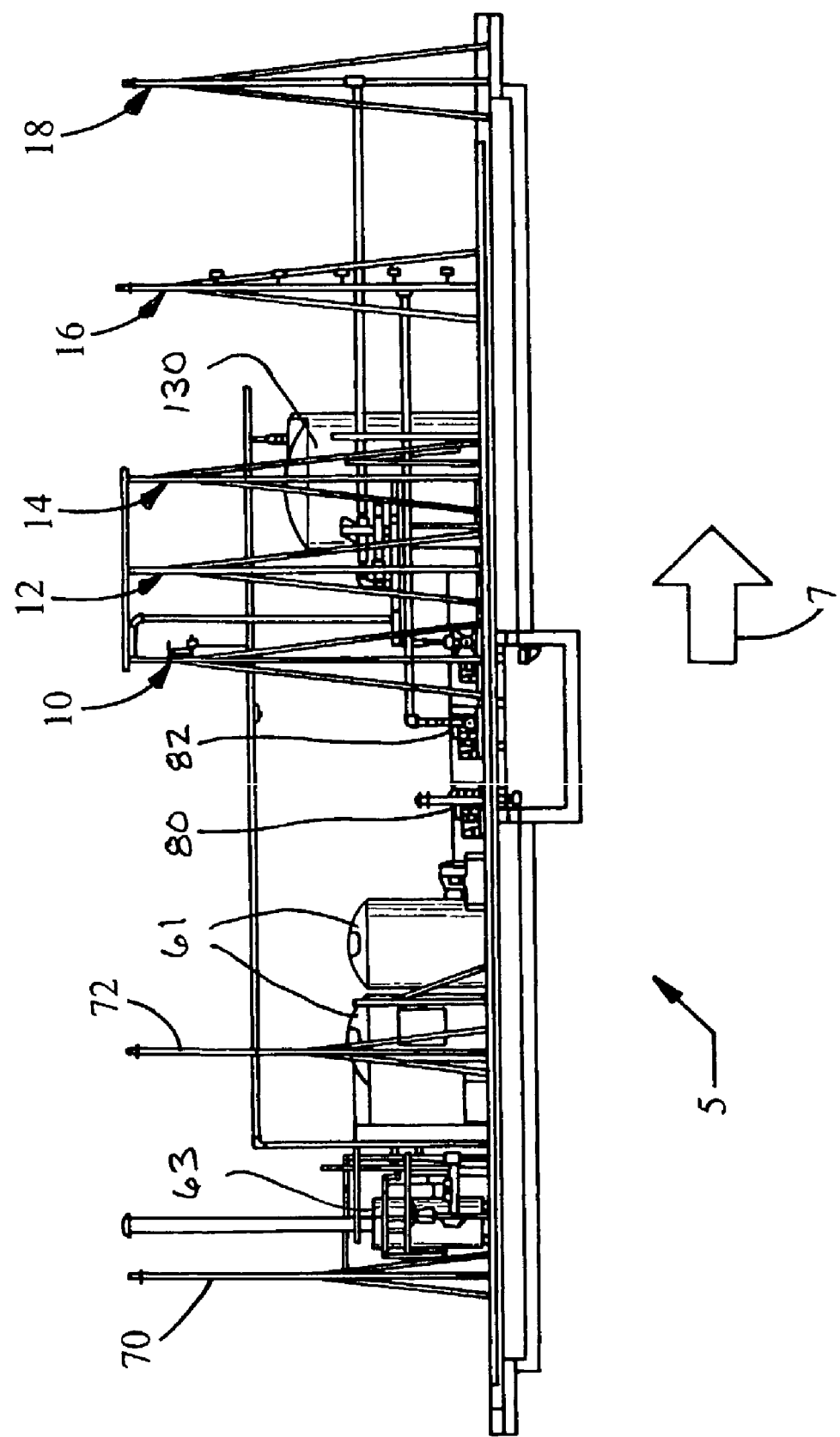
FIG. 4 is a sectional view generally along line 4-4 of FIG. 2.
Figure 5:
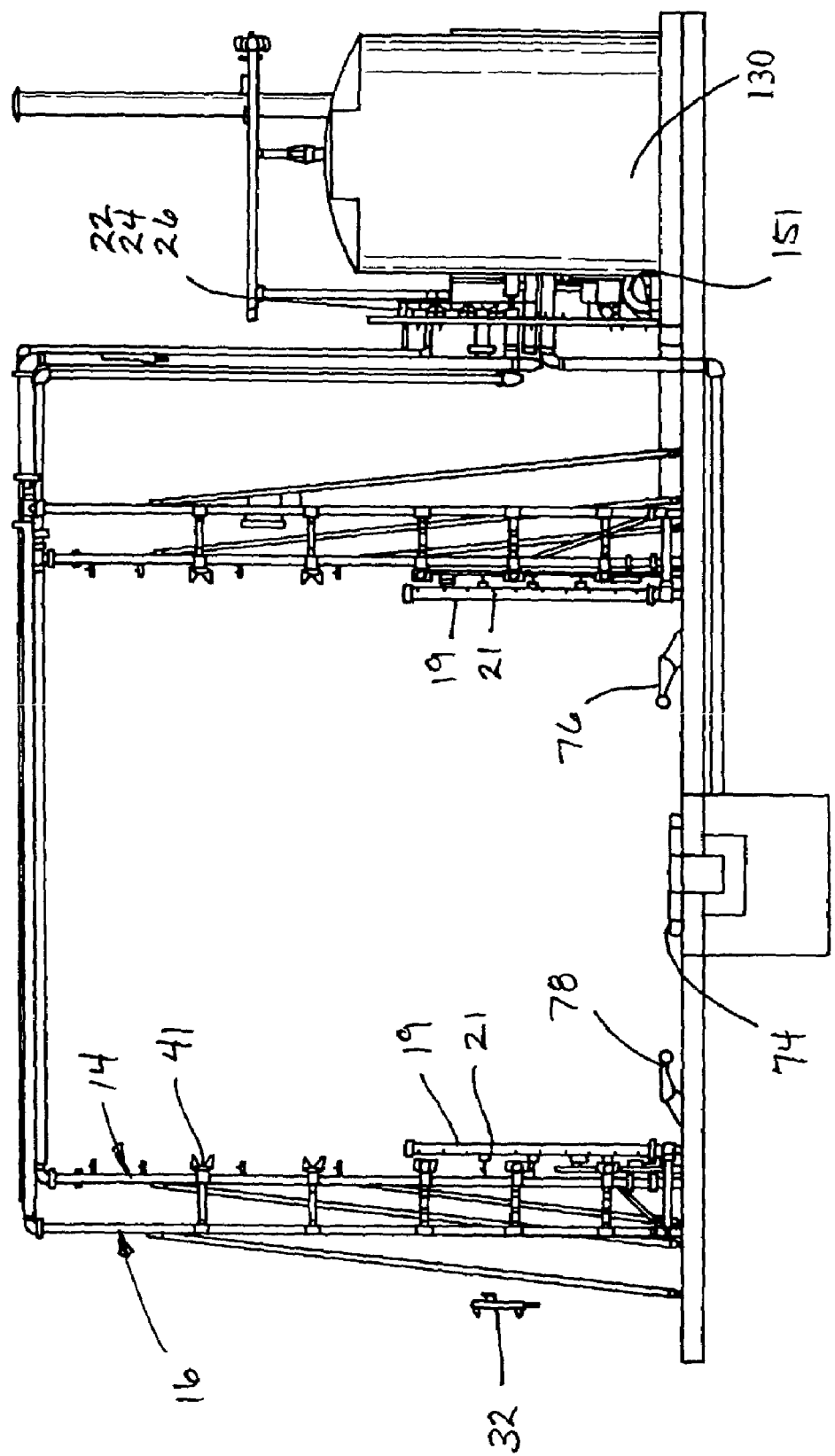
FIG. 5 is and end view, with portions cut away, of the truck wash system of FIG. 1.

Referring now to FIG. 3, a schematic layout for the vehicle wash system 5 is shown. Chemical pumps 142 pump chemicals from chemical tanks 61. Valves 144 are opened by the controller 36 via a chemical wall module 144 and send chemicals, along with heated and softened water, to soap arches 70 and 72. High pressure pump 80 couples the water tank 130 with the chassis wash 74 for washing the under carriage of the truck 8. High pressure pump 20 also couples the water tank 130 to arched spray assemblies 10, 12, 14 and 18 through the valve module 86 controlled by controller 36 and which may itself be pneumatically operated via an air compressor 151 in conjunction with the controller 36. When valve 22 is opened, arched spray assemblies 10 and 14 receive high pressure water from high pressure pump 20. When valve 24 is opened, spray assembly 12 receives high pressure water from high pressure pump 20. When valve 26 is opened, arched spray assembly 18 receives high pressure water from high pressure pump 20. Because these valves 22, 24 and 26 are opened only one at a time, only one high pressure pump is required for this aspect of the vehicle wash system. Another high pressure pump 80 is connected directly to spray assembly 16 for when spinner assemblies 41 or spray arms 19 are desired to be used.

FIGS. 6, 7 and 8 show side, rear quarter and close-up views of the salt truck 8. From this it can be seen that there are many intricacies of the vehicle and understood the difficulty in thorough cleaning such vehicles.

While the above description constitutes the preferred embodiments of the present invention, it will be appreciated that the invention is susceptible to modification, variation and change without departing from the proper scope and fair meaning of the accompanying claims.

The claimed invention is:

1. A vehicle wash system for washing a vehicle moving along a line of travel, said wash system comprising:
   a set of longitudinally spaced spray assemblies each having a plurality of nozzles located to spray water on the vehicle, said set of spray assemblies includes at least a first spray assembly, a second spray assembly, a third spray assembly and a fourth spray assembly being sequentially arranged in said system along the line of travel of the vehicle;
   a pump commonly connected to said set of spray assemblies and adapted to provide high pressure water thereto;
   a set of valves corresponding in number to no more than the number of said spray assemblies, said valves operable to open and close the flow of water from said pump to said spray assemblies;
   a plurality of sensors for determining the location of a vehicle as it travels through said spray assemblies; and
   a controller coupled to said sensors end said valves, said controller adapted to open and close said valves in a prescribed sequence such that at some point during operation of said system said set of said spray assemblies receives water provided by said pump in a non-sequential order, wherein said controller is configured to operate said first and third spray assemblies simultaneously with each other and said subsequently second and fourth spray assemblies sequentially with each other wherein said sensors are adapted to sense the position of the vehicle and to provide a signal to said controller to turn on and off the spray assemblies.

2. The vehicle wash system of claim 1 wherein said set of valves includes a first valve, a second valve and a third valve.

3. The vehicle wash system of claim 2 wherein said first valve is commonly coupled with both said first spray assembly and said third spray assembLy.

4. The vehicle wash system of claim 3 wherein said second valve is coupled to said second spray assembly and said third valve us coupled to said fourth spray assembly.

5. The vehicle wash system of claim 1 wherein said nozzles on said first spray assembly are directed at a forward oblique angle to said line of travel of the vehicle.

6. The vehicle wash system of claim 5 wherein said nozzles on said third spray assembly are directed at a rearward oblique angle to the line of travel of the vehicle.

7. The vehicle wash system of claim 1 wherein said nozzles on said first spray assembly are directed to clean a rear side of a portion of the vehicle moving therepast.

8. The vehicle wash system of claim 7 wherein said nozzles on said third spray assembly are directed to clean a front side of a portion of the vehicle moving therepast.

9. The vehicle wash system of claim 1 wherein said nozzles on said second spray assembly are oriented generally transverse to the line of travel of the vehicle and downward onto the vehicle.

10. The vehicle wash system of claim 1 further comprising a fifth spray assembly, said fifth spray assembly being located between said third and fourth spray assemblies, at least some nozzles of said fifth spray assembly being spinning nozzles.

11. The vehicle wash system of claim 10 wherein said fifth spray assembly is coupled to a second high pressure pump.

12. The vehicle wash system of claim 1 wherein said fifth spray assembly further includes a spray arch and a pair of upright spray arms spaced apart from said spray arch.

13. The vehicle wash system of claim 1 wherein said nozzles of said fourth spray assembly are directed at a rearward oblique angle to said line of travel of the vehicle.

14. The vehicle wash system of claim 13 wherein said nozzles of said fourth spray assembly are located on upright side portions of said fourth spray assembly.

15. The vehicle wash system of claim 1 wherein said nozzles of said first and third spray assemblies are located on upright side portions of said first and third spray assemblies.

16. The vehicle wash system of claim 1 wherein said controller, upon said vehicle encountering a first sensor, is configured to simultaneously activate said first and third spray assemblies, and upon said vehicle encountering a second sensor, said controller deactivating said first and third spray assemblies and activating said second spray assembly, and upon said vehicle encountering a third sensor, said controller deactivating said second spray assembly and activating said fourth spray assembly.

17. The vehicle wash system of claim 16 wherein said vehicle includes a cargo bed with a cargo bed Interior and said controller is configured to time said activation of said second spray assembly such that water from said second spray assembly is directed into said cargo bed interior, and to deactivate said second spray assembly after said cargo bed has moved beyond said second spray assembly.

* * * * *